United States Patent
De Stefano et al.

(10) Patent No.: US 10,689,558 B2
(45) Date of Patent: *Jun. 23, 2020

(54) SELF-CROSSLINKING POLYMERS FOR WELLBORE STRENGTHENING

(71) Applicant: M-I L.L.C., Houston, TX (US)

(72) Inventors: Guido De Stefano, Spring, TX (US); Brandi Katherine Price Hoelscher, Houston, TX (US); Aaron Blue, Katy, TX (US); Clint Falgout, Houston, TX (US)

(73) Assignee: M-I L.L.C., Houston, TX (US)

( * ) Notice: Subject to any disclaimer, the term of this patent is extended or adjusted under 35 U.S.C. 154(b) by 187 days.

This patent is subject to a terminal disclaimer.

(21) Appl. No.: 15/143,308

(22) Filed: Apr. 29, 2016

(65) Prior Publication Data

US 2016/0319179 A1 Nov. 3, 2016

Related U.S. Application Data

(60) Provisional application No. 62/155,214, filed on Apr. 30, 2015.

(51) Int. Cl.
*C09K 8/36* (2006.01)
*C09K 8/035* (2006.01)

(52) U.S. Cl.
CPC ............... *C09K 8/36* (2013.01); *C09K 8/035* (2013.01); *C09K 2208/08* (2013.01)

(58) Field of Classification Search
CPC .................................................. C09K 8/685; C09K 2208/04; C09K 2208/08; C09K 8/03; C09K 8/06; C09K 8/36; C09K 8/512; C09K 8/516; C09K 2208/10; C09K 8/032; C09K 8/035; C09K 8/502; C09K 8/52; C09K 8/725; C09K 8/882; C09K 8/887; C09K 8/90; E21B 21/003; E21B 33/138; E21B 36/04; E21B 43/04; E21B 43/2401; E21B 43/26; E21B 7/14
See application file for complete search history.

(56) References Cited

U.S. PATENT DOCUMENTS

| | | | | |
|---|---|---|---|---|
| 3,337,494 A | * | 8/1967 | Reid ................... | C09D 109/00 524/254 |
| 2002/0198302 A1 | * | 12/2002 | Rouse ................... | B29B 7/002 524/407 |
| 2006/0096759 A1 | | 5/2006 | Reddy et al. | |
| 2008/0064612 A1 | * | 3/2008 | Xiang ..................... | C09K 8/36 507/118 |
| 2011/0056752 A1 | * | 3/2011 | Young ..................... | C09K 8/08 175/57 |
| 2011/0118381 A1 | | 5/2011 | Fang et al. | |
| 2014/0041869 A1 | * | 2/2014 | Weaver ................. | C09K 8/528 166/278 |
| 2014/0060843 A1 | * | 3/2014 | Murphy ................... | C09K 8/03 166/310 |
| 2016/0017201 A1 | * | 1/2016 | Yang ....................... | C09K 8/32 507/140 |

FOREIGN PATENT DOCUMENTS

WO 2010/089528 A1 8/2010
WO WO2014/089214 * 6/2014

OTHER PUBLICATIONS

PCT International Search Report dated Aug. 22, 2016, issued by the Patent Cooperation Treaty in related International Application No. PCT/US2016/030258 (4 pages).
PCT Written Opinion of the International Searching Authority (PCT Rule 43bis.1) dated Aug. 22, 2016, in related International Application No. PCT/US2016/030258 (7 pages).
International Preliminary Report on Patentabiliby for the equivalent International patent application PCT/US2016/030258 dated Nov. 9, 2017.

* cited by examiner

*Primary Examiner* — Kumar R Bhushan

(57) ABSTRACT

Wellbore fluids, and methods of use thereof, are disclosed. Wellbore fluids may include a non-oleaginous internal phase, an oleaginous external phase, a first latex-containing copolymer comprising at least one copolymer formed from at least one natural polymer and at least one latex monomer, and a second latex polymer distinct from the first latex polymer.

8 Claims, No Drawings

SELF-CROSSLINKING POLYMERS FOR WELLBORE STRENGTHENING

CROSS-REFERENCE TO RELATED APPLICATIONS

This application claims priority to U.S. 62/155,214 filed on Apr. 30, 2015, which is herein incorporated by reference in its entirety.

BACKGROUND

During the drilling of a wellbore, various fluids are typically used in the well for a variety of functions. The fluids may be circulated through a drill pipe and drill bit into the wellbore, and then may subsequently flow upward through the wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

As stated above, wellbore fluids are circulated downhole to remove rock as well as deliver agents to combat the variety of issues described above. Wellbore fluid compositions may be water- or oil-based and may comprise weighting agents, surfactants, proppants, and polymers. However, for a wellbore fluid to perform all of its functions and allow wellbore operations to continue, the fluid must stay in the borehole. Frequently, undesirable formation conditions are encountered in which substantial amounts or, in some cases, practically all of the wellbore fluid may be lost to the formation. For example, wellbore fluid can leave the borehole through large or small fissures or fractures in the formation or through a highly porous rock matrix surrounding the borehole. Thus, fluid loss or lost circulation is a recurring drilling problem, characterized by loss of wellbore fluids into downhole formations that are fractured, highly permeable, porous, cavernous, or vugular.

Reducing drilling fluid pressure invasion into the wall of a borehole is one of the most important factors in maintaining wellbore stability. It is recognized that sufficient borehole pressure will stabilize shales to maintain the integrity of the borehole. When mud or liquid invades the shale, the pressure in the pores rises and the pressure differential between the mud column and the shale falls. With the drop in differential pressure, the shale is no longer supported and can easily break off and fall into the wellbore. Likewise, the invasion of water into the shale matrix increases hydration or wetting of the partially dehydrated shale body causing it to soften and to lose its structural strength. Chemical reactivity can also lead to instability. There is always a need for a better composition and method to stabilize the shale formations.

There is an analogous need to seal and prevent fluid loss when recovering hydrocarbons from sand formations, particularly depleted sand formations. Depleted sand formations are productive, or formerly productive, hydrocarbon zones that have been produced, drawn down, or otherwise depleted of their content, creating a lower formation pressure than that of the fluid which may be in use in the well. Because of this pressure differential, it is important to partially or completely seal the sand formation to inhibit or prevent fluid loss of the mud into the sand.

In attempting to cure these and other problems, crosslinkable or absorbing polymers, loss control material (LCM) pills, and cement squeezes have been employed. These additives have found utility in preventing mud loss, stabilizing and strengthening the wellbore, and in zonal isolation and water shutoff treatments. Some typical viscosifying additives used in well fluids to combat fluid loss include natural polymers and derivatives thereof such as xanthan gum and hydroxyethyl cellulose (HEC). In addition, a wide variety of polysaccharides and polysaccharide derivatives may be used, as is known in the art.

Further, providing effective fluid loss control without damaging formation permeability in completion operations has been a prime requirement for an ideal fluid loss-control pill. Conventional fluid loss control pills include a variety of polymers or resins, calcium carbonate, and graded salt fluid loss additives, which have been used with varying degrees of fluid loss control. These pills achieve their fluid loss control from the presence of specific solids that rely on filter-cake build up on the face of the formation to inhibit flow into and through the formation. However, these additive materials can cause severe damage to near-wellbore areas after their application. This damage can significantly reduce production levels if the formation permeability is not restored to its original level. Further, at a suitable point in the completion operation, the filter cake must be removed to restore the formation's permeability, preferably to its original level.

Induced mud losses may also occur when the mud weight, required for well control and to maintain a stable wellbore, exceeds the fracture resistance of the formations. A particularly challenging situation arises in depleted reservoirs, in which the drop in pore pressure weakens hydrocarbon-bearing rocks, but neighboring or inter-bedded low permeability rocks, such as shales, maintain their pore pressure. This can make the drilling of certain depleted zones impossible because the mud weight required to support the shale exceeds the fracture resistance of the sands and silts.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a wellbore fluid, where the wellbore fluid may include a non-oleaginous internal phase, an oleanginous external phase, a first latex-containing copolymer comprising at least one copolymer formed from at least one natural polymer and at least one latex monomer, and a second latex polymer distinct from the first latex polymer.

In another aspect, embodiments disclosed herein relate to methods for drilling a wellbore, where the method may include introducing a wellbore fluid into the wellbore, and circulating the wellbore fluid while drilling. The wellbore fluid in such methods comprises a non-oleaginous internal phase, an oleaginous external phase, a first latex-containing copolymer comprising at least one copolymer of a natural polymer and a latex monomer, and a second latex polymer distinct from the first latex polymer.

In other aspects, embodiments disclosed herein relate to a wellbore fluid, where the wellbore fluid may include a non-oleaginous internal phase, an oleanginous external phase, a copolymer, and a graphite additive.

In other aspects, embodiments disclosed herein relate to methods for drilling a wellbore, where the method may include introducing a wellbore fluid into the wellbore, and circulating the wellbore fluid while drilling. The wellbore fluid in such methods comprises a non-oleaginous internal phase, an oleaginous external phase, a copolymer, and a graphite additive.

Other aspects and advantages of the claimed subject matter will be apparent from the following description and the appended claims.

DETAILED DESCRIPTION

In one aspect, embodiments disclosed herein relate to wellbore fluids that include multiple, distinct latex monomers and/or polymers for preventing wellbore fluid loss downhole. In some embodiments, the wellbore fluids for preventing wellbore fluid loss downhole and including the latex polymers may be invert emulsion based fluids. In another aspect, embodiments disclosed herein relate to methods for drilling a wellbore including introducing a wellbore fluid into the wellbore and circulating the wellbore fluid within the wellbore while drilling. Specifically, embodiments disclosed herein illustrate that combinations of latex or latex-containing polymers may result in synergist effect in the formation of a filter cake and/or the prevention of fluid loss to the formation while achieving desired fluid rheology.

Frequently, the type of fluid loss control additive used in a wellbore fluid (such as a drilling fluid) depends on numerous factors inclusive of the type of formation to be sealed, planned depth of the well and the temperatures expected to be encountered downhole. For example, wellbore fluids, spacer fluids and flushes including natural polymers, such as gums, starch and cellulose derivatives, for the purpose of fluid loss control or for particle suspension, may become less stable at elevated temperatures. Further, wellbore fluids containing natural polymers that become less stable at elevated temperatures (some may degrade at temperatures as low as 275° F.) may not be suitable for long term performance applications or HPHT wells where downhole temperatures routinely are at the higher end of the temperature range over which these natural polymers are stable. Consistent exposure to temperatures at the higher end of this range may lead to degradation of the natural polymer components of the wellbore fluid. This degradation may in turn lead to loss of control of wellbore fluid loss or filtration loss into the formation. As such, wellbore fluids including natural polymers which are thermally unstable at higher temperatures may not be suitable for long term performance applications or HPHT wells.

Thus, wellbore fluids of the present disclosure may use a combination of latex-based polymers to achieve filtration control and fluid rheology that may be stable at temperatures up to and even greater than 400° F. For example, wellbore fluids and methods of drilling of the present disclosure, including copolymers of natural polymers and latexes, may provide control over wellbore fluid and filtrate loss over temperatures greater than 400° F., while blends of discrete natural polymers and latexes would not be stable at the higher end of this range, as the natural polymer component and/or latex component would degrade, causing premature degradation of the filtercake. However, such copolymers, when used alone in an invert emulsion may in fact have a thinning effect, but when used in combination with at least one other latex polymer, the fluid may have the desired rheological profile.

Natural Polymer-Latex Copolymer

As mentioned above, one of the latex-containing polymers may be a copolymer of a latex as a first species with a natural polymer as a second species. Such copolymer may be a block or graft copolymer. In one or more embodiments, the copolymer is a formed by ionic bond formation between a natural polymer and a latex polymer.

As used herein, "natural polymers" refer to any polymer produced by living organisms. Examples of natural polymers include polysaccharides, lignins, lignitic materials, and tannins. One of skill in the art would appreciate the scope of natural polymers useful in the methods and aqueous wellbore fluids disclosed herein.

Lignins

Lignins are complex, natural, amorphous polymers related to cellulose that provide rigidity and together with cellulose form the woody cell walls of plants and the cementing material between them. Lignins are formed from the oxidative coupling of, primarily, 4-hydroxyphenylpropanoids. An example of the structure of a small piece of lignin

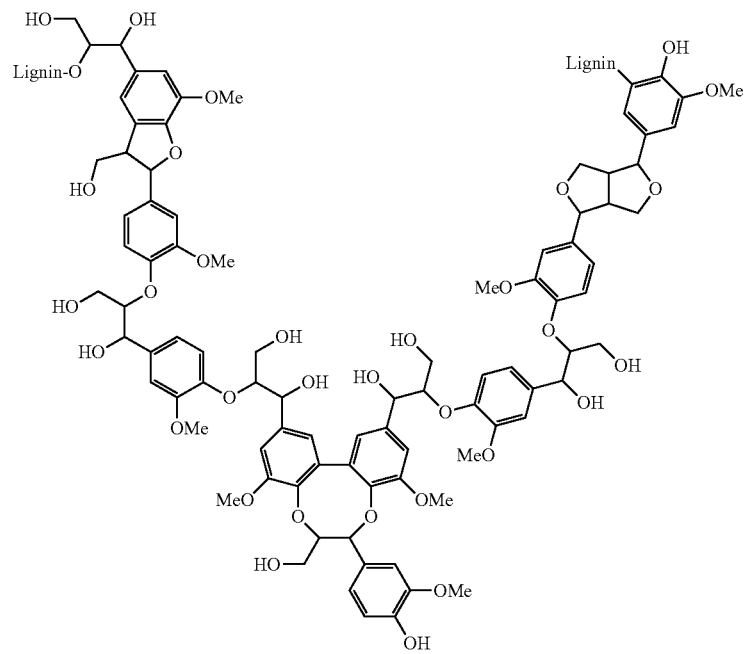

polymer is presented below:

Lignin is therefore a complex polymer of phenylpropane units, which are cross-linked to each other. This complexity has thus far proven fairly resistant to microbial degradation. Some fungi have developed the necessary enzymes to break lignin apart. The initial decomposition reactions are mediated by extracellular lignin and manganese peroxidases, primarily produced by white-rot fungi. Soil bacteria such as *Actinomycetes* can also decompose lignin, but typically degrade less than 20 percent of the total lignin present. Lignin degradation tends to be primarily an aerobic process, and in an anaerobic environment, such as in the wellbore, lignin can persist for very long periods. Further, one skilled in the art would appreciate that such lignitic materials may also include lignosulfonates, which are modified lignins.

Tannins

Tannins are naturally occurring plant polyphenols. Tannins are common in fruits such as grapes, persimmon, and blueberry, in tea, in chocolate, in legume trees such as *Acacia*, and *Sesbania*, and in grasses and grains such as sorghum and corn. Tannins may be hydrolysable or condensed. Hydrolysable tannins are composed of a polyol carbohydrate such as D-glucose partially or totally esterified with phenolic groups such as gallic acid (in gallotannins) or ellagic acid (in ellagitannins). Hydrolyzable tannins are hydrolyzed by weak acids or weak bases to produce carbohydrate and phenolic acids. The structure of a hydrolysable tannin is represented below.

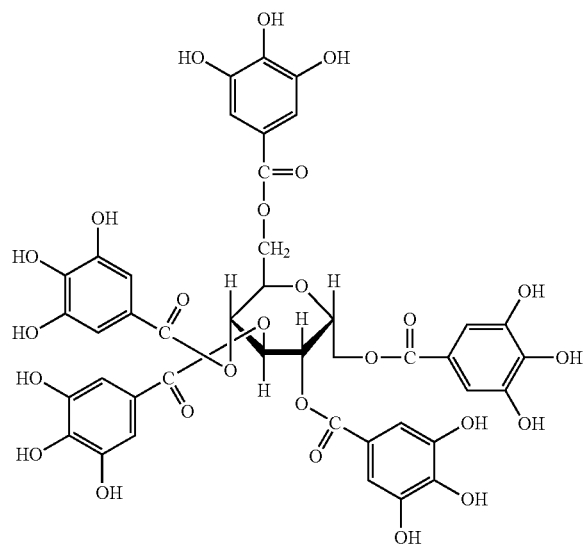

Condensed tannins, also known as proanthocyanidins, are polymers of 2 to 50 (or more) flavanoid units that are joined by carbon-carbon bonds, which are not susceptible to being hydrolysed. While hydrolysable tannins and most condensed tannins are water soluble, some very large condensed tannins are insoluble. Further, one skilled in the art would appreciate that use of tannins may also include modified tannins.

Polysaccharides

Polysaccharides are polymers of monosaccharides joined together by glycosidic linkages. They tend to be large, often branched macromolecules found in nature. Monomer units of natural polymers tend to be six-carbon monosaccharides, and the natural polymer may therefore be represented by a general formula of $(C_6H_{10}O_5)_n$ where n is usually a number between 40 and 3000. Examples of polysaccharides useful as monomers in embodiments of the present disclosure include starch, glycogen, cellulose, locust bean gums, xanthan gums, wellan gums, scleroglucan gums, and guar gums and mixtures and derivatives thereof. However, no limitation of the type of polysaccharide that may be used as a monomer is intended.

Starches are naturally occurring natural polymers found in green plant cells and some microorganisms. The starch or cellulose may be from any botanical source such as a cereal, a fruit, a root, or a tuber. Some examples of starches include potato starch, corn starch, tapioca starch, wheat starch and rice starch. Like other naturally occurring natural polymers, starches consist of only glycosidic units. The glycosidic units found in starch are amylose and amylopectin, both of which consist of alpha-D-glucose units only.

Amylose is a substantially linear, sparsely branched polymer with a molecular mass in the range of $10^5$ to $10^6$ g/mol primarily from 1-4 linked glucose units. The structure of amylose is represented as below:

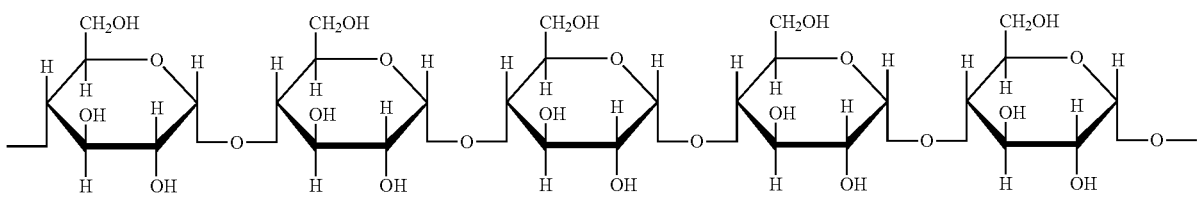

Amylopectin is a highly branched molecule with a molecular mass between $10^7$ and $10^9$ g/mol. Amylopectin also contains 1-4 linked glucose units, but in addition, 1-6 glucosidic branching points occur every 20-30 glucose units. The structure of amylopectin is represented as below:

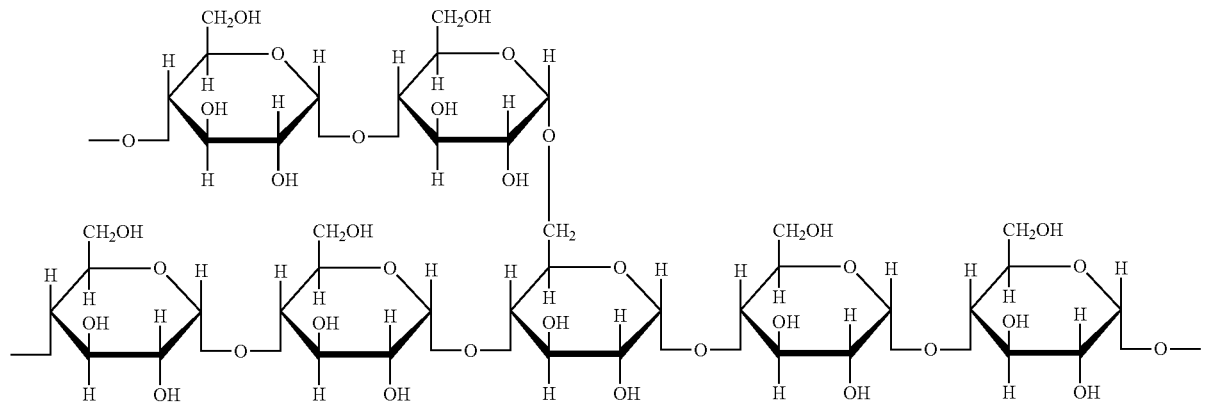

The ratio of amylose to amylopectin found in starch is typically 20:80 or 30:70. It is also possible to use a starch having an increased amylose or increased amylopectin content.

Polysaccharides tend to be hydrophilic due to the presence of —OH groups present on the monosaccharide units. The extent of the reaction of the natural polymer with water is dependent on the degree of internal hydrogen bonding and the sterical flexibility of the particular natural polymer used. Many polysaccharides, such as starches, interact with water. This interaction with water may cause swelling of the natural polymer. Where polysaccharides are used in water-based wellbore fluids, measures have to be taken to prevent premature swelling of the polysaccharides.

Natural polymer monomer units useful in embodiments herein may be also be derivatized. "Derivatized natural polymers" refers to natural polymers that have been modified chemically. Such derivatized natural polymers may include hydroxyalkyl starches and gums, starch and gum esters, cross-linked starches and gums, hypochlorite oxidized starches and gums, starch and gum phosphate monoesters, cationic starches and gums, starch and gum xanthates, and dialdehyde starches and gums. These derivatized natural polymers may be manufactured using any means known in the art. Examples of derivatized starches include carboxymethyl starches, hydroxyethyl starches, hydroxypropyl starches, hydroxybutyl starches, carboxymethylhydroxyethyl starches, carboxymethylhydroxypropyl starches, carboxymethylhydroxybutyl starches, polyacrylamide starches, and other starch copolymers.

As used herein, "latex monomer" may refer to any synthetic or natural rubber, which is in and of itself a polymer. A variety of well-known latex materials can be used as latex monomer units in embodiments of the copolymer of the present disclosure. For example, natural rubber (cis-1,4-polyisoprene) and most of its modified types may be used. Synthetic polymers of various types may also be used, including polymers or copolymers of vinyl acetate, vinyl esters of fatty acids, esters of acrylic and methacrylic acids, acrylonitrile, styrene, vinyl chloride, vinylidene chloride, tetrafluoroethylene and other mono-olefinically unsaturated monomers. Some examples of latex monomers which may be useful in embodiments of the present disclosure include styrene/butadiene, cis-1,4-polybutadiene and copolymers thereof, high styrene resin, butyl, ethylene/propylene, neoprene, nitrile, cis-1,4-polyisoprene, silicone chlorosulfonated polyethylene, epichlorohydrin, fluorocarbon, fluorosilicone, polyurethane, polyacrylic and polysulfide.

The natural polymer/latex copolymers of the present disclosure have been found to have properties of both natural polymer and latex components. For example, the natural polymer/latex copolymers have both hydrophilic and hydrophobic sections. As such, these copolymers may be considered amphiphilic in nature, and thus may exhibit greater compatibility with water-based wellbore fluids than latexes. Also, because of the latex component, natural polymer/latex copolymers may exhibit less swelling than comparable polymers of their natural polymer components. Further, these copolymers have demonstrated heat stability at temperatures higher than comparable polymers of their natural polymer components. Wellbore fluids including the natural polymer/latex copolymers of the present disclosure may exhibit advantages over comparable wellbore fluids including either comparable polymers of their natural polymer components, or comparable polymers of their latex components.

An example of a natural polymer/latex copolymer useful in embodiments of the present disclosure is a starch graft styrene/1,3-butadiene copolymer commercially available as Pencote®™ (Penford Products Company, Cedar Rapids, Iowa). Pencote®™ is produced from the reaction products of styrene and 1,3-butadiene and a thinned lightly oxidized hydroxyethyl starch having a solids concentration of 21% by weight and characterized by an intrinsic viscosity of about 0.23 dl/g. Another starch graft copolymer useful in embodiments herein is commercially available as Penflex™ (Penford Products Company, Cedar Rapids, Iowa). Yet another starch graft copolymer useful in embodiments herein is available commercially as Pensize®™ (Penford Products Company, Cedar Rapids, Iowa). Pensize®™ is a styrene/1,3-butadiene starch graft copolymer produced from a highly thinned oxidized hydroxyethyl starch characterized by an intrinsic viscosity of about 0.077 dl/g. Yet another starch graft copolymer useful in embodiments herein is Cp-318 (Penford Products Company, Cedar Rapids, Iowa). One skilled in the art would recognize that any natural polymer/latex copolymer may be useful in embodiments herein.

Suitable natural polymer to latex ratios for the natural polymer/latex copolymers of the present disclosure may range from about 98 weight percent natural polymer to 2 weight percent latex monomer to about 25 weight percent natural polymer to 75 weight percent latex monomer. In a particular embodiment, the ratio of natural polymer to latex may range from 70 weight percent natural polymer to 30 weight percent latex monomer to about 40 weight percent natural polymer to 60 weight percent latex monomer. However, one skilled in the art would appreciate that other ranges may be used as well.

In embodiments where the latex monomer is itself a copolymer, for example, where styrene/butadiene is the latex monomer, suitable monomer ratios in a styrene/butadiene copolymer may range from about 70 parts by weight of styrene and 30 parts by weight of butadiene to about 30 parts by weight of styrene and 70 parts by weight of butadiene. For example, Penflex™ is characterized by a latex to starch ratio of 42 parts latex to 58 parts starch by weight with the latex having a butadiene to styrene ratio of 42 parts butadiene to 58 parts styrene by weight. In particular embodiments, styrene/butadiene copolymers may generally comprise higher ratios of butadiene to styrene due to the lesser cost of butadiene.

Thus, in one or more embodiments, the copolymer may be a three component system of styrene, butadiene, and a carbohydrate, at a ratio of 20/20/60, where the carbohydrate interacts with the styrene-butadiene backbone by ionic bonding. Further, because latexes are hydrophobic in nature, and tend to form discrete particles in aqueous solution to minimize interaction with water, surfactants may be added to improve the interaction of the copolymer (particularly the latex component) with water. Such surfactants may include, for example, anionic and/or nonionic surfactants that may stabilize the latex-containing copolymer by electrostatic repulsion or steric stabilization, respectively. Such surfactants may be used in an amount ranging from 0.2 to 5 weight percent of the copolymer system.

In one or more embodiments, the latex-natural polymer copolymer may be provided in a wet or a dry version. For example, it may be added to the wellbore fluid as a solution or as a spray dried solid. Spray drying the latex-natural polymer copolymer may ensure that the particles have a narrower size distribution. In one or more embodiments, there may be two latex-natural polymer copolymers in the wellbore fluid that are similar in chemistry with one being wet and one being a dry version.

Additional Latex Polymer

In one or more embodiments of the present application, in addition to the latex-natural polymer copolymer, a latex (only) polymer may also be included in the wellbore fluid. This second latex polymer included in the wellbore fluid may be a polymer or copolymer formed from the latex monomers described above, i.e., the second polymer is a polymer or copolymer that does not possess any polysaccharide, lignin, lignitic materials, and tannin components, in contrast to the latex-natural polymer copolymer described above. For example, natural rubber (cis-1,4-polyisoprene) and most of its modified types may be used. Synthetic polymers of various types may also be used, including polymers or copolymers of vinyl acetate, vinyl esters of fatty acids, esters of acrylic and methacrylic acids (or salts and esters thereof), acrylonitrile, styrene, butadiene, vinyl chloride, vinylidene chloride, tetrafluoroethylene and other mono-olefinically unsaturated monomers. Some examples of latex polymers which may be useful in embodiments of the present disclosure include styrene/butadiene, cis-1,4-polybutadiene and copolymers thereof, high styrene resin, butyl, ethylene/propylene, neoprene, nitrile, cis-1,4-polyisoprene, silicone chlorosulfonated polyethylene, epichlorohydrin, fluorocarbon, fluorosilicone, polyurethane, polyacrylic and polysulfide. Further, it is also intended that other copolymers of two or more monomers of the above described polymers may also be used. When copolymers are used, the copolymer may be a graft, block, or random copolymer. In one or more embodiments, this copolymer may be emulsified with one or more carboxylic acid soaps, such as rosin or tall oil soaps, and may include acids such as oleic acid, linoleic acid, and abietic acid alone or in combination with various fatty acids.

In some embodiments, the second latex polymer is a styrene/butadiene block copolymer and suitable monomer ratios in the styrene/butadiene copolymer may range from about 70 parts by weight of styrene and 30 parts by weight of butadiene to about 30 parts by weight of styrene and 70 parts by weight of butadiene. In one or more embodiments, when the monomer species are varied, the ratio of the monomers may also be varied, such as from 20:80 to 80:20.

Further, it is also envisioned that some embodiments may use a third latex polymer, which may also be selected from the above list. In the embodiments where a third latex polymer is used, the polymer may be distinct from the second latex polymer in either or both of the monomer species or the stabilizer used. Thus, for example, in one or more embodiments, the polymers may be distinct: a styrene/butadiene copolymer used in combination with a styrene/acrylate copolymer. In one or more embodiments, the ratio of monomer species may vary between the two polymers In one or more embodiments, one latex polymer may be stabilized by a rosin acid soap and the other latex polymer may be stabilized by a surfactant (such as an anionic, cationic, or nonionic surfactant). Further, in one or more embodiments, both the polymer and the stabilizer may be different.

Latexes, formed by emulsion polymerization, result from the polymerization of monomers emulsified in an aqueous phase. In one or more embodiments, the resulting latex polymer particles formed and used in the wellbore fluids of the present disclosure may range in size from about 75 to 200 nanometers, 80 to 150 nanometers, or 90 to 100 nanometers.

Platelet/Graphite Additive

In some embodiments, it may be particularly beneficial to include at least one graphite additive to the wellbore fluid. In one or more embodiments, the graphite additive may be a flake graphite. In one or more embodiments, the graphite additive may have a substantially platelet-like (or two-dimensional) geometry, possessing at least one nanoscale dimension. In some instances, the nanoscale dimension may be substantially smaller than the two other dimensions (i.e., rendering a platelet-like geometry). For example, the graphite additive may have an average thickness (i.e., a dimension perpendicular to the basal plane of graphite) from about 1 to 20 nanometers in some embodiments, from about 1 to 10 nanometers in some embodiments, and from about 5-8 nanometers in some embodiments. In some embodiments, the graphite additive may be graphene, where graphene is defined as a single atom thick allotrope of carbon in the form of a two-dimensional hexagonal lattice. Further, the diameter of the graphite additive (i.e., dimension along the graphite basal plane) may range from about 1 to 50 microns in some embodiments, from about 1 to 25 microns in some embodiments, and from about 1 to 5 microns in some embodiments. It is also envisioned that in one or more embodiments, a larger than nanoscale thickness may be used, i.e., in low microscale, with two other greater dimensions such that the platelet shape is retained. In yet other embodiments, other shapes of graphite may be used.

The average surface area of the graphite particles may range from about 10 to 1000 m²/g in some embodiments, from about 10 to 800 m²/g in some embodiments, from about 10 to 500 m²/g in some embodiments and from about 10 to 300 m²/g in some embodiments. In some embodiments, the graphite particles may be produced using non-oxidative processes, which thereby renders the basal plane of the graphite surface with a very low defect density having primarily sp² carbon. Due to the termination of the C—C bonding at the edges of graphite (and graphene), the edges of the basal planes are terminated by functional groups like ethers, carboxyls, or hydroxyls.

However, this application is not intended to be limited to graphite (or graphene) additives and in some embodiments, a platelet-like (or two-dimensional) material that is compositionally distinct from graphite (or graphene) may be utilized as an additive for the wellbore fluid (in combination with or separately from a graphite additive). For example, a variety of materials with layered structures (i.e. a material that has a simple repeating unit layer that may be repeated (e.g., stacked) many times to make the macroscale material structure) may be capable of forming two-dimensional platelet-like additives, possessing at least one nanoscale dimension, that can be added to a wellbore fluid formulation. In one or more embodiments, the platelet-like or two-dimensional materials may include a little as a single layer up to about several "repeating" layers of the layered structure. Thus, in one or more embodiments, a platelet-like additive may include metal organic framework compounds, oxides (e.g., vanadium pentoxide), nitrides (e.g., hexagonal boron nitride) transition metal di-chalcogenides (e.g., tungsten diselenide and molybdenum disulfide), MXenes (i.e., layered transition metal carbides and carbonitrides with a general formula of $M_{n+1}X_nT_x$, where M is an early transition metal, X is carbon and/or nitrogen, and $T_x$ refers to surface terminations, which are mostly oxo, hydroxyl, or fluoride groups). These material may possess dimensions where the platelet-like additive may have an average thickness (i.e., a dimension perpendicular to the basal plane of the layered material) from about 1 to 20 nanometers in some embodiments, from about 1 to 10 nanometers in some embodiments, and from about 5-8 nanometers in some embodiments. Further, the diameter (i.e., dimension along the graphite basal plane) may range from about 1 to 50 microns in some embodiments, from about 1 to 25 microns in some embodiments, and from about 1 to 5 microns in some embodiments. It is also envisioned that in one or more embodiments, a larger than nanoscale thickness may be used, i.e., in low microscale, with two other greater dimensions such that the platelet shape is retained.

In one or more embodiments, the graphite or other platelet-like additive may be added to the wellbore fluids in an amount of about 0.5 to 15 pounds per barrel (ppb). In more particular embodiment, the graphite or other platelet-like additive may be added to the wellbore fluids in an amount of about 1 to 12 pounds per barrel.

In one or more embodiments, the graphite, graphene, and other platelet-like additives used in wellbore fluids of the present disclosure may be smaller in size than the barite or other weighting agent used in the wellbore fluid. Further, graphite, graphene, and the other platelet-like additives listed above, when used in combination with the latex polymers in a wellbore fluid, may augment a filtercake formed from circulating the wellbore fluid within the wellbore by providing improved barrier and mechanical properties to the filtercake. It is envisioned that the graphite particles may serve to interact and/or create crosslinks between multiple latex polymers.

Fiber Additive

In one or more embodiments, it may be beneficial to include at least one fiber type additive in addition to, or separate from, a graphite or platelet-like additive into the wellbore fluid. In one or more embodiments, the wellbore fluid may incorporate at least one synthetic fiber type. In particular embodiments, the synthetic fibers may include high aspect ratio polymeric fibers. In some embodiments, acid soluble synthetic fibers may include polyamides such as nylon 6, nylon 6,6, and combinations thereof. The diameter of the synthetic fiber has been identified as parameter that may determine both the performance of the synthetic fiber as a lost circulation material, and a variable that may be used to tune the rate of dissolution of the fiber upon exposure to acidic media. As an example, the denier of the nylon fiber, which is the mass in grams of 9,000 meters of a selected fiber, may be used as a guide for determining the acid solubility of the fiber. For example, a higher denier nylon may be more soluble than a lower denier nylon. For example, in various embodiments, a denier of at least 2, 4, 6, or 8 may be selected. Also affecting acid solubility may be temperature. For example, a sample may have a relatively low acid solubility at room temperature, but upon exposure to elevated temperatures, such as 100° C. and greater, the solubility may be increased to substantially or completely soluble.

In other embodiments, the synthetic fibers may be selected from polyaramids, polyamides, polyesters, polyethylene terephthalate, polytriphenylene terephthalate, polybutylene terephthalate, polylactic acid, poly(lactic-co-glycolic acid), polyglycolic acid, poly(ε-caprolactone) and combinations thereof Polyolefins may include, for example, propylene based homopolymers, copolymers, and multi-block interpolymers, and ethylene based homopolymers, copolymers, and multi-block interpolymers, and combinations thereof.

In one or more embodiments, the synthetic fibers may have lengths within the range of 100 μm to 20 mm. In other embodiments the synthetic fibers may have lengths within the range of 500 μm to 15 mm In particular embodiments, a nylon fiber having a length in the range of 1 to 10 mm may be used, and a mineral fiber having a length of 5 to 15 mm may be used. In one or more embodiments, the diameter of the fibers may fall within the range of 0.1 μm to 60 μm. In yet another embodiment, the diameter of the fibers may be within the range of 0.5 μm to 50 μm. In particular embodiments, a nylon fiber having a diameter in the range of 20 μm to 50 μm may be used, and a mineral fiber having a diameter of 1 to 15 μm may be used.

In one or more embodiments, the fiber additive may be a mineral fiber (also referred to in the art as mineral wool or man-made mineral fibers) such as a fiber formed from various oxide materials such as $SiO_2$, $Al_2O_3$, CaO, MgO, and/or $Fe_2O_3$, used in combination in an extrusion spun process to form fibers. Such mineral fibers may be formed, for example, by melting/extruding blast furnace slug and/or basalt (or other mineral containing materials), alone or in combination. Generally, mineral fibers may be formed from natural or synthetic mineral sources, and then may be extruded, spun, or otherwise formed into fiber form.

In one or more embodiments, the mineral fiber additive may be a natural mineral fiber such as MAGMA™ fiber available from Lost Circulation Specialists, Inc., Casper, Wyo., USA. This fiber is 99.8% acid soluble and thermally stable at temperatures up to 1,800 degrees. The specific gravity of those fibers is 2.6 with no tendency to float. MAGMA™ fiber is an inert non-damaging material towards the environment with an LC-50 of one million. MAGMA™ fiber is available in a "fine" form having a length of from about 0.1 to about 4 mm and a "regular" form having a length of from about 4 to about 20 mm with an average length of about 10 to about 16 mm. The fiber diameters of both grades of MAGMA™ fiber ranges from about 5 to about 15 microns with an average diameter of about 7 to about 10 microns. MAGMA™ fibers are obtained as mixtures of multiple sizes. Fiber for use in the wellbore fluids of the present disclosure may optionally be cut from either form as appropriate.

In one or more embodiments, the wellbore fluids of the present disclosure may include an inorganic crystalline fiber component that may exhibit a greater structural rigidity to that of a synthetic fiber component. In one or more embodiments, the inorganic crystalline fiber component may be aragonite, one of the predominant crystalline forms of calcium carbonate. Aragonite exhibits an acicular orthorhombic structure with typical crystal habits of twinned hexagonal prismatic crystals, as well as a number of elongated crystal shapes including curved bladed, steep pyramidal, chisel-shaped, branched, and coral or worm-like structures. Because aragonite is composed of calcium carbonate, the material is acid soluble, releasing carbon dioxide upon dissolution. In other embodiments, inorganic crystalline fibers may be polymorphs of calcium carbonate such as vaterite, or other acid soluble minerals (e.g, magnesium carbonate) having high aspect ratio crystal habits or acicular form.

In one or more embodiments, the inorganic crystalline fibers may have lengths within the range of 100 μm to 20 mm. In other embodiments the crystalline fibers may have lengths within the range of 500 μm to 10 mm. In one or more embodiments, the diameter of the inorganic crystalline fibers may fall within the range of 0.1 μm to 1 μm. In yet another embodiment, the diameter of the inorganic crystalline fibers may be within the range of 0.5 μm to 0.75 μm.

Further, in addition to or instead of the synthetic fiber and inorganic crystalline fibers, the wellbore fluid may include a natural fiber to aid in suspension and viscosification, as well as provide additional compressive strength to the resulting plug or seal. As used herein, the term "natural fiber" refers to an additive formed from a naturally occurring material that has an elongated structure, which may be spun into filaments or used as a component of a composite material such as paper. Similar to the synthetic fibers structure described above, the natural fibers may be inert with respect to the base fluid and to the other wellbore fluid components.

Natural fibers may include vegetable fibers, wood fibers, animal fibers, and mineral fibers. In embodiments, the natural fiber component used in the pills may include cellulose, or other glucose-based polysaccharides. Cellulose from wood pulp has typical chain lengths between 300 and 1700 units, whereas cotton and other plant fibers as well as bacterial celluloses have chain lengths ranging from 800 to 10,000 units. No limit on the type of natural fibers (or cellulose in particular) that may be used in the pills of the present disclosure is intended; however, in a particular embodiment, cellulose fibers may be either virgin or recycled, extracted from a wide range of plant species such as cotton, straw, flax, wood, etc.

Additionally, it is also within the scope of the present disclosure that such cellulosic materials may be combined, pressed together to form larger sheets. Some commercial sources of cellulose (paper) may optionally be coated to render the sheets hydrophilic or hydrophobic; however, such coatings are optional. The sheets may then be finely divided for use in the slurries disclosed herein.

In one or more embodiments, the natural fibers may have lengths within the range of 1 μm to 20 mm. In other embodiments the natural fibers may have lengths within the range of 500 μm to 10 mm. In one or more embodiments, the diameter of the fibers may fall within the range of 0.1 μm to 1 μm. In yet another embodiment, the diameter of the fibers may be within the range of 0.5 μm to 0.75 μm.

In one or more embodiments, the fiber additive may be a powdered cellulose based fiber material such as ARBOCEL® available from J. Rettenmaier & Söhne GmbH+Co KG. ARBOCEL® is a powder fibrous cellulose additive that is water-insoluble and organic solvent-insoluble. In general, the fiber length may vary from about 8 microns to 2000 microns with narrower length fractions available as well.

Further, it is within the scope of this disclosure to use specific narrower fractions from within the above stated ranges in lengths for the fiber materials to ensure that the average length dimension of the fiber materials used in the wellbore fluid is smaller than the average size of the barite or other weighting agent used in the wellbore fluids. In one or more embodiments, the fiber materials may be included in the wellbore fluids in amounts of about 1-5 ppb.

Additionally, one skilled in the art would recognize that in addition to the multiple latex polymers, other additives may be included in the wellbore fluids disclosed herein, for instance, weighting agents, viscosifiers, wetting agents, corrosion inhibitors, oxygen scavengers, anti-oxidants and free radical scavengers, biocides, surfactants, dispersants, interfacial tension reducers, pH buffers, mutual solvents and thinning agents.

Wellbore Fluid Formulation

In one embodiment, the wellbore fluid may be an invert emulsion fluid that may include a non-oleaginous internal phase and an oleaginous external phase. The non-oleaginous internal phase may include the multiple latex compositions and optionally be formed from a high density brine solution, which can serve as a weighting agent. The oleaginous external phase may include an oleaginous fluid such as diesel or other suitable hydrocarbon or synthetic oil, and an emulsifier. Optionally other components of the wellbore fluid may include a viscosifying agent, a wetting agent, and a cleaning agent.

The oleaginous fluid used for formulating the invert emulsion fluids used in the practice of the present disclosure are liquids such as a natural or synthetic oil. In one or more embodiments, the oleaginous fluid is selected from the group including diesel oil, mineral oil, a synthetic oil, such as hydrogenated and unhydrogenated olefins including poly-alpha olefins, linear and branch olefins and the like, polydiorganosiloxanes, siloxanes, or organosiloxanes, esters of fatty acids, specifically straight chain, branched and cyclical alkyl ethers of fatty acids. The concentration of the oleaginous fluid should be sufficient so that an invert emulsion forms and may be less than about 99% by volume of the invert emulsion. However, generally the amount of oleaginous fluid must be sufficient to form a stable emulsion when utilized as the continuous phase. In various embodiments, the amount of oleaginous fluid may be at least about 30 percent, 40 percent, or 50 percent by volume of the total fluid. In one embodiment, the amount of oleaginous fluid is from about 30 to about 95 percent by volume or from about 40 to about 90 percent by volume of the invert emulsion fluid.

The non-oleaginous fluid also used in the formulation of the invert emulsion fluids is a liquid, such as an aqueous liquid. In one or more embodiments, the non-oleaginous fluid may be selected from the group including sea water, a brine containing organic and/or inorganic dissolved salts, liquids containing water-miscible organic compounds and combinations thereof. The amount of the non-oleaginous fluid is generally less than the theoretical limit needed for forming an invert emulsion. In various embodiments, the amount of non-oleaginous liquid is at least about 1, 5, or 10 percent by volume of the total fluid. Correspondingly, the amount of the non-oleaginous fluid should not be so great that it cannot be dispersed in the oleaginous phase. Thus, in one embodiment, the amount of non-oleaginous fluid is less than about 70% by volume such as from about 1% to about 70% by volume. In another embodiment, the non-oleaginous fluid is preferably from about 10% to about 60% by volume of the invert emulsion fluid.

In some embodiments, the non-oleaginous fluid is a brine containing salts of alkali and alkaline earth metals. For example, brines formulated with high concentrations of sodium potassium, or calcium salts of the halides, formate, acetate, nitrate, and the like; cesium salts of formate, acetate, nitrate, and the like, as well as other compounds that should be well known to one of skill in the art.

The invert emulsion fluids of the present application may further contain additional chemicals depending upon the end use of the fluid so long as they do not interfere with the functionality of the fluids (particularly the emulsion when using invert emulsion fluids) described herein. For example, weighting agents, wetting agents, organophilic clays, viscosifiers, fluid loss control agents, surfactants, dispersants, interfacial tension reducers, pH buffers, mutual solvents, thinners, thinning agents and cleaning agents may be added to the fluid compositions of this invention for additional functional properties. The addition of such agents should be well known to one of ordinary skill in the art of formulating wellbore fluids and muds.

In one or more embodiments, a portion of the density may be based on the brine in the non-oleaginous phase; however, it is also envisioned that a solid weighting agent may also be used. The quantity and nature of the solid weighting agent may depend upon the desired density and viscosity of the final composition. Example weighting agents include, but are not limited to, barite, calcite, mullite, gallena, manganese oxides, iron oxides, mixtures of these and the like. The weighting agents may be added in order to obtain a drilling fluid density of less than about 24, 21, or less than about 19.5 pounds per gallon. In one or more embodiments, the weighting agents may have a $d_{50}$ particle size ranging from 1 micron to 75 microns or from 20 to 70 microns in a more particular embodiment.

Surfactants and wetting agents that may be suitable for use in the wellbore fluid include crude tall oil, oxidized crude tall oil, surfactants, organic phosphate esters, modified imidazolines and amidoamines, alkyl aromatic sulfates and sulfonates, and the like, and combinations or derivatives of these. However, when used with an invert emulsion fluid, the use of fatty acid wetting agents should be minimized so as to not adversely affect the reversibility of the invert emulsion disclosed herein. Faze-Wet™, VersaCoat™, SureWet™, SureMul™, Versawet™ and Versawet™ NS are examples of commercially available surfactants and wetting agents manufactured and distributed by M-I L.L.C. that may be used in the fluids disclosed herein. Silwet L-77, L-7001, L7605, and L-7622 are examples of commercially available surfactants and wetting agents manufactured and distributed by General Electric Company (Wilton, Conn.).

Organophilic clays, normally amine treated clays, may be useful as viscosifiers and/or emulsion stabilizers in the fluid composition of the present invention. Other viscosifiers, such as oil soluble polymers, polyamide resins, polycarboxylic acids and soaps can also be used. The amount of viscosifier used in the composition can vary upon the end use of the composition. However, normally about 0.1% to 6% by weight range is sufficient for most applications. VG69™ and VG-PLUS™ are organoclay materials distributed by M-I, L.L.C., Houston, Tex., and Versa-HRP™ is a polyamide resin material manufactured and distributed by M-I, L.L.C., that may be used in the fluid composition.

Suitable thinners that may be used in the wellbore fluids disclosed herein include, for example, lignosulfonates, modified lignosulfonates, polyphosphates, tannins, and low molecular weight polyacrylates. Thinners are typically added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing mud properties at elevated temperatures.

The inclusion of cleaning agents in the fluids disclosed herein should be well known to one of skill in the art. A wide variety of synthetic and natural product derived cleaning agents may be used. For example, a common natural product derived cleaning agent is d-limonene.

The methods used in preparing the invert emulsion fluids utilized in the methods of the present disclosure are not critical. Specifically, conventional methods can be used to prepare the invert emulsion fluids in a manner analogous to those normally used to prepare oil-based drilling fluids. In one representative procedure, a desired quantity of oleaginous fluid, such as diesel oil, may be mixed with the selected emulsifier, viscosifying agent, and wetting agent. The internal non-oleaginous phase may be prepared by combining the latex polymers into the selected brine with continuous mixing. An invert emulsion of the present invention is formed by vigorously agitating, mixing, or shearing the oleaginous fluid and the non-oleaginous fluid.

Wellbore Fluid Use

A wellbore fluid according to the invention may be used in a method for drilling a well into a subterranean formation in a manner similar to those wherein conventional wellbore fluids are used. In the process of drilling the well, a wellbore fluid is circulated through the drill pipe, through the bit, and up the annular space between the pipe and the formation or steel casing to the surface. The wellbore fluid performs several different functions, such as cooling the bit, removing drilled cuttings from the bottom of the hole, suspending the cuttings and weighting material when the circulation is interrupted. In addition, the wellbore fluids of the present disclosure may provide filtration control to prevent excessive loss of wellbore fluids into the formation. The term "filtration control," as used herein, refers to any reduction of fluid loss into the formation achieved by use of the wellbore fluids of the present disclosure.

Wellbore fluids of the present disclosure may be emplaced into the wellbore using conventional techniques known in the art. In more particular embodiments, the wellbore fluids of the present disclosure may be used during an overbalanced drilling operation. The latex polymers may be added to the drilling, completion, or workover fluid. In some embodiments, if sealing of a particular interval of the wellbore is needed, a solution of the multiple latex polymers may be injected to such an interval, in addition to other intervals such as in a pill. The wellbore fluids described herein may be used in conjunction with any drilling or completion operation.

In particular, the wellbore fluids of the present disclosure may be injected into a work string, flow to bottom of the wellbore, and then out of the work string and into the annulus between the work string and the casing or wellbore. This batch of treatment is typically referred to as a "pill." The pill may be pushed by injection of other wellbore fluids such as completion fluids behind the pill to a position within the wellbore which is immediately above a portion of the formation where fluid loss is suspected. Injection of fluids into the wellbore is then stopped, and fluid loss will then move the pill toward the fluid loss location. Positioning the pill in a manner such as this is often referred to as "spotting" the pill. Injection of such pills is often through coiled tubing or by a process known as "bullheading."

Upon introducing a wellbore fluid of the present disclosure into a borehole, a filtercake may be formed which provides an effective sealing layer on the walls of the borehole preventing undesired invasion of fluid into the formation through which the borehole is drilled. Filtercakes formed from wellbore fluids disclosed herein include multiple latex polymers and may have unexpected properties. Such properties may include increased pressure blockage, reliability of blockage, and increased range of formation pore size that can be blocked. These filtercakes may provide filtration control across temperature ranges up to greater than 400° F.

Where the formation is a low permeability formation such as shales or clays, the filtercakes formed using the wellbore fluids and methods of the present disclosure prevent wellbore fluid and filtrate loss by effectively blocking at least some of the pores of the low permeation formation. This may allow for support of the formation by maintaining sufficient pressure differential between the wellbore fluid column and the pores of the wellbore. Further, the filtercakes formed by wellbore fluids of the present disclosure may effectively seal earthen formations. These filtercakes are stable at elevated temperatures, and may also effectively seal low permeability formations.

Where the wellbore fluid is used in drilling through a formation such as depleted sandstone, etc., the wellbore fluid may serve to ameliorate difficulties in drilling overbalanced through such formations without reaching formation breakdown. For example, the wellbore fluid may extend the drilling window to avoid formation breakdown. This may occur because the filtercake provides a strengthening layer on the formation such that when fracture initiation occurs behind the filtercake the fracture does not immediately result in propagation because the filtercake may be able to effectively absorb some of the energy associated with the fracture initiation. For example, for a fracture to propagate after being initiated, the filtercake must first breakdown, but in the present instance, the wellbore fluids disclosed may have sealing properties as well as strengthening materials (fibers, graphite, latex) that can bridge the initiated fracture. Further, whereas conventional lost circulation materials (LCM) may have a single component sized smaller than barite, with other LCM components larger than the weight agent, the wellbore fluids of the present disclosure contain latexes, graphite/platelet, and fiber additives that are optionally all sized below the barite thereby allowing the fibers to lay across and bridge smaller fractures and the latex to attach to the barite and help bridge larger fractures.

In one or more embodiments, the drilling window, defined as the difference between the maximum pore pressure and the minimum effective fracture pressure may be increased by at least 500 psi when using wellbore fluids of the present disclosure, as compared to using the drilling window presented using conventional fluids. Due to the enhanced drilling window provided by the wellbore fluids of the present disclosure, if fracture initiation is detected during drilling the delayed propagation and overall strength/stability provided by the filtercake may allow for the operator to reduce the pressure to remove the likelihood of filtercake breakdown (which would otherwise conventionally lead to fracture propagation and formation breakdown). Thus, drilling may continue at such lower pressures through the formation without experiencing formation breakdown.

Before taking the well into production, filtercake in the producing region may be removed, such as by using a variety of techniques known in the art. For example, filtercakes according to the present disclosure may be removed using a breaker fluid comprising an acidic aqueous solution. Examples of acids that may be used include strong mineral acids, such as hydrochloric acid or sulfuric acid, and organic acids, such as citric acid, lactic acid, malic acid, acetic acid, and formic acid. The breaker fluid may have a pH below 4, or below 3 in another embodiment. In other embodiments, the filter cake may be removed using a breaker liquid comprising a natural polymer degrading enzyme, for example, a carbohydrase. Examples of such enzymes include amylases, pullulanases, and cellulases. In yet other embodiments, the filtercake may be removed using a washing liquid comprising an oxidizing agent, such as sodium hypochlorite.

EXAMPLES

Wellbore fluids were prepared with composition according to Table 1 below.

TABLE 1

Wellbore Fluid Preparation

| | | Example | | | | |
|---|---|---|---|---|---|---|
| | Comp | 1 | 2 | 3 | 4 | 5 |
| IO 16-18, g | 146 | 126 | 131 | 130 | 131 | 150 |
| VG-PLUS ™, g | 3 | 3 | 3 | 3 | 3 | 3 |
| Lime, g | 4 | 4 | 4 | 4 | 4 | 4 |
| SUREMUL ™, g | 7 | 7 | 7 | 7 | 7 | 7 |
| SUREWET ™, g | 2 | 2 | 2 | 2 | 2 | 2 |
| 25% $CaCl_2$ brine, g | 82 | N/A | N/A | N/A | N/A | 82 |
| 37.6% $CaCl_2$ brine, g | N/A | 42 | 42 | 42 | 42 | N/A |
| Water, g | N/A | 10 | 10 | 10 | 10 | N/A |
| Barite, g | 350 | 350 | 350 | 350 | 350 | 350 |
| Polymer 1, g | N/A | 20 | 20 | 20 | 20 | N/A |
| Polymer 2, g | N/A | 20 | 20 | 20 | 20 | N/A |
| Polymer 3, g | N/A | 10 | 10 | 10 | 10 | N/A |
| Graphite 1, g | N/A | N/A | 1.2 | N/A | N/A | 1.2 |
| Graphite 2, g | N/A | N/A | N/A | 1.2 | N/A | N/A |
| Graphite 3, g | N/A | N/A | N/A | N/A | 1.2 | N/A |

The fluids used a variety of additives, all of which are commercially available from M-I LLC (Houston, Tex.). VG-PLUS™ is an amine treated organophilic bentonite clay used as a viscosifier and gelling additive. SUREMUL™ is an emulsifier providing preferential wetting of solids by the continuous phase, filtration control, and temperature stability. SUREWET™ is a wetting agent and secondary emulsifier used for thermal stability, filtration control, and reducing water contamination.

Polymer 1 is a 20:20:60 styrene-butadiene-starch copolymer stabilized by a surfactant; polymer 2 is a hot polymerized 50:50 styrene-butadiene copolymer emulsified with a rosin acid soap; and polymer 3 is a 75:25 styrene-acrylate copolymer stabilized by a surfactant.

Graphite 1 is a graphite product that has a surface area from about 100 to 175 $m^2/g$, average graphite particle diameter of about 25 microns, and thickness from about 5 to 10 nanometers. Graphite 2 is a graphite product that has a surface area from about 475 to 525 $m^2/g$, average graphite particle diameter from 1 to 5 microns, and a thickness from about 1-5 nanometers. Graphite 3 is a graphite product that has a surface area from about 725 to 775 $m^2/g$, average graphite particle diameter from 1 to 5 microns, and a thickness from about 1-5 nanometers.

The wellbore fluids were then aged by hot rolling for 16 hours at 150° F. The rheology of the resulting wellbore fluid was measured at 150° F. using a Fann 35 viscometer. The rheological parameters are as shown in Table 2 below.

TABLE 2

Rheology of Wellbore Fluids

| RHEOLOGY at 150° F. | Comp. | Ex. 1 | Ex. 2 | Ex. 3 | Ex. 4 | Ex. 5 |
|---|---|---|---|---|---|---|
| 600 RPM | 48 | 167 | 125 | 109 | 113 | 43 |
| 300 RPM | 28 | 93 | 71 | 60 | 62 | 23 |
| 200 RPM | 21 | 67 | 53 | 46 | 46 | 15 |
| 100 RPM | 14 | 41 | 34 | 29 | 30 | 10 |
| 6 RPM | 6 | 10 | 9 | 8 | 8 | 3 |
| 3 RPM | 5 | 9 | 7 | 7 | 7 | 4 |
| GELS 10" | 6 | 10 | 8 | 8 | 8 | 4 |
| GELS 10' | 7 | 12 | 8 | 9 | 8 | 5 |
| APPARENT VISC. | 24 | 83.5 | 62.5 | 54.5 | 56.5 | 21.5 |
| PLASTIC VISC. | 20 | 74 | 54 | 49 | 51 | 20 |
| YIELD POINT | 8 | 19 | 17 | 11 | 11 | 3 |
| ES | 370 | 500 | 456 | 497 | 468 | 400 |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for drilling a wellbore comprising:
mixing a first latex-containing polymer and a second latex polymer into an aqueous liquid to provide a non-oleaginous fluid of an internal non-oleaginous phase, wherein the first latex-containing polymer is a copolymer of a natural polymer and a latex monomer, the latex monomer of the first latex-containing polymer is at least one selected from styrene-butadiene copolymers, polymethyl methacrylate, polyethylene, polyvinylacetate, natural latex, polyisoprene, polydimethylsiloxane, polyvinylacetate copolymers, and mixtures thereof, and the second latex polymer is distinct from the first latex-containing polymer;

agitating, mixing or shearing the non-oleaginous fluid of the internal non-oleaginous phase and an oleaginous fluid of an external oleaginous phase to provide a wellbore fluid, wherein the wellbore fluid comprises graphite particles having an average surface area from about 10 $m^2/g$ to 1000 $m^2/g$;

introducing the wellbore fluid into the wellbore;

circulating the wellbore fluid while drilling;

allowing the first latex-containing polymer and the second latex polymer to form at least part of a filtercake on a wall of the wellbore; and augmenting the filtercake with the graphite and particles such that the graphite particles create crosslinks between the first latex-containing polymer and the second latex polymer.

2. The method of claim 1, wherein the wellbore fluid further comprises:
at least one fiber material.

3. The method of claim 1, wherein the wellbore fluid further comprises:
a third latex polymer.

4. The method of claim 1, wherein the second polymer is synthesized from one or more monomers selected from vinyl acetate, vinyl esters of fatty acids, esters of acrylic and methacrylic acids, acrylonitrile, styrene, butadiene, vinyl chloride, vinylidene chloride, and tetrafluoro ethylene.

5. The method of claim 1, wherein the ratio of natural polymer to the latex monomer is from about 7:3 to about 2:3.

6. The method of claim 1, wherein latex polymer particles of the wellbore fluids have a size from about 90 to 100 nanometers.

7. The method of claim 1, wherein latex polymer particles of the wellbore fluids have a size from about 75 to 200 nanometers.

8. The method of claim 1, wherein the latex monomer of the first latex-containing polymer is a styrene-butadiene copolymer.

* * * * *